(12) United States Patent
Suzuki

(10) Patent No.: US 9,541,767 B2
(45) Date of Patent: Jan. 10, 2017

(54) IMAGING LENS

(71) Applicant: KANTATSU CO., LTD., Yaita-shi, Tochigi (JP)

(72) Inventor: Hisanori Suzuki, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 14/675,924

(22) Filed: Apr. 1, 2015

(65) Prior Publication Data
US 2015/0293370 A1    Oct. 15, 2015

(30) Foreign Application Priority Data

Apr. 14, 2014   (JP) ................ 2014-082421

(51) Int. Cl.
| | | |
|---|---|---|
| *G02B 5/18* | (2006.01) | |
| *G02B 3/02* | (2006.01) | |
| *G02B 9/00* | (2006.01) | |
| *G02B 9/14* | (2006.01) | |
| *G02B 27/42* | (2006.01) | |
| *G02B 13/00* | (2006.01) | |
| *G02B 13/18* | (2006.01) | |

(52) U.S. Cl.
CPC ....... *G02B 27/4211* (2013.01); *G02B 13/0035* (2013.01); *G02B 13/18* (2013.01); *G02B 27/4216* (2013.01)

(58) Field of Classification Search
CPC ............. G02B 9/62; G02B 9/60; G02B 13/18; G02B 9/34; G02B 5/005; G02B 1/041; G02B 13/16; G02B 13/0035; G02B 13/002; H04N 5/2254; H04N 5/2253

USPC ......... 359/708, 713–715, 738–740, 784–785
See application file for complete search history.

(56) References Cited

U.S. PATENT DOCUMENTS

2009/0180200 A1*  7/2009  Amanai ............... G02B 9/12
                                                        359/716
2014/0347515 A1* 11/2014  Iba .................... G02B 13/004
                                                        348/222.1

FOREIGN PATENT DOCUMENTS

| JP | 2007-127953 A | 5/2007 | |
|---|---|---|---|
| JP | 2010-113306 A | 5/2010 | |
| WO | WO 2013054509 A1 * | 4/2013 | ........... G02B 13/004 |

* cited by examiner

*Primary Examiner* — Jade R Chwasz
(74) *Attorney, Agent, or Firm* — Oliff PLC

(57) ABSTRACT

An imaging lens includes, from an object side to an image side: a first positive lens having a convex object-side surface; an aperture stop; a second negative lens as a meniscus double-sided aspheric lens having a concave object-side surface; and a third positive lens as a meniscus double-sided aspheric lens having a concave image-side surface, wherein the second lens has a diffractive optical surface on the object side, the aspheric object-side and image-side surfaces of the third lens have pole-change points off an optical axis, and conditional expressions (1) to (4) below are satisfied:

$$8.0 < fdoe/f < 26.0 \qquad (1)$$

$$20 < vd1 - vd2 < 40 \qquad (2)$$

$$20 < vd3 - vd2 < 40 \qquad (3)$$

$$0.8 < ih/f < 0.95 \qquad (4).$$

8 Claims, 13 Drawing Sheets

IMAGING LENS

The present application is based on and claims priority of Japanese patent application No. 2014-082421 filed on Apr. 14, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens built in an image pickup device mounted in an increasingly compact and low-profile smartphone or mobile phone, PDA (Personal Digital Assistant), game console or information terminal such as a PC, or a home appliance with a camera function.

Description of the Related Art

In recent years, there has been a general tendency that mobile terminals such as smartphones and home appliances have a camera function. Today, whereas high-end models with a high-resolution camera function comparable to a digital still camera have been introduced into the market, the need for inexpensive popular models with a certain level of camera performance is still high. An imaging lens composed of three elements (constituent lenses) may be suitable as an imaging lens to be built in an inexpensive popular model because it can deliver a certain level of imaging performance and can be applied to a low-profile device and supplied at low cost. However, with the recent trend toward smaller higher-pixel image sensors, the pixel size is becoming smaller and the pixel density is becoming higher. Nowadays, image sensors with a pixel pitch of less than 1.2 microns have been proposed. An imaging lens for use in such an image sensor is expected to not only feature the smallness of aberrations but also provide a high-brightness optical system with an F-value smaller than 2.8 (often seen in the past). As for mobile terminals in particular, the imaging lens is expected to be low-profile enough to be applicable to a low-profile product. Furthermore, the imaging lens is anticipated to be able to capture an image of an object over a wide field of view so as to flexibly cope with the various camera functions of the product.

Conventionally, as an example of an imaging lens composed of three constituent lenses, the imaging lens described in JP-A-2010-113306 (Patent Document 1) includes, in order from an object side, an aperture stop, a first lens with positive refractive power, a second lens with negative refractive power, and a third lens. The third lens has, on the both sides, aspheric surfaces which are convex-curved toward the object near an optical axis and concave-curved toward the object in the vicinity of the lens periphery so that the refractive power changes according to the distance from the optical axis. The thickness of the first lens on the optical axis, the air gap on the optical axis between the first and second lenses, the focal length of the third lens, and the relation in curvature radius between the object-side surface and the image-side surface of the first lens are determined so as to achieve a wide field of view.

The imaging lens described in JP-A-2007-127953 (Patent Document 2) is an optical system which corrects chromatic aberrations using a diffractive optical surface. The imaging lens described in Patent Document 2 includes at least three constituent lenses and at least one of the lens surfaces of these lenses has a diffractive surface. At least one of the lens surfaces of the lens located nearest to the image plane has negative optical power in its center and the optical power changes to positive power as the distance to the lens periphery decreases, making up a compact optical system with high telecentricity.

According to Patent Document 1, the imaging lens can capture an image of an object over a wide field of view from 76 to 78 degrees and corrects aberrations relatively properly. However, since the F-value is 2.8, there is difficulty in applying the imaging lens to a compact high-density image sensor as mentioned above. The imaging lens described in Patent Document 1 has a total track length of 4.6 to 5.5 mm and the ratio of the total track length to the diagonal length of the effective imaging plane of the image sensor (divide total track length by diagonal length of the effective imaging plane of the image sensor; hereinafter referred to as the ratio to diagonal) is about 1.0; however, in order to make the imaging lens more low-profile and offer brightness with an F-value of 2.8 or less, the problem related to correction of aberrations has to be addressed.

According to Patent Document 2, the imaging lens can capture an image of an object over a maximum field of view of 72 degrees and corrects aberrations relatively properly. However, the positive, positive and negative refractive power lenses are arranged in order from the object side and chromatic aberrations are corrected not by the combination of the first and second lenses but by the diffractive optical surface. When the dependence on the diffractive optical surface for correction of chromatic aberrations is high, the number of orbicular zones formed on the lens surface tends to increase, which means that flare is more likely to occur. If two diffractive optical surfaces are formed to address this problem, high precision is required in the lens forming and assembling processes to prevent misalignment between the diffractive optical surfaces, which implies a higher degree of manufacturing difficulty. In connection with low-profileness, the third lens, located nearest to the image plane, has negative refractive power and the back focus is relatively long, making it difficult to achieve low-profileness. In the imaging lens composed of three constituent lenses as described in Patent Document 2, the total track length is about 6.8 mm and the ratio to diagonal is more than 1.1. If the back focus is decreased to achieve low-profileness, the angle of incidence on the third lens must be increased and as a consequence, probably the effective diameter of the second lens must be larger. When the lens diameter is larger, spherical aberrations and coma aberrations increase. This will make it difficult to make the imaging lens more low-profile while ensuring high performance. In addition, since the F-value of the imaging lens disclosed in Patent Document 2 is 3.3, it is difficult to apply the imaging lens to the latest high-density image sensors.

SUMMARY OF THE INVENTION

The present invention has been made in view of the above problem of the conventional art and an object thereof is to provide a high-performance low-cost imaging lens composed of three constituent lenses which offers high-brightness and a wide field of view and is low-profile and compact enough to be applicable to the low-profile high-density image sensors used in the latest mobile terminals and capable of correcting various aberrations properly.

Here, "low-profile" implies that total track length is smaller than the diagonal length of the effective imaging plane of the image sensor, that is, the diagonal ratio is 1.0 or less, and "wide field of view" implies that the field of view is 80 degrees or more. The diagonal length of the effective imaging plane of the image sensor is equal to the diameter of an effective image circle whose radius is the maximum image height, that is, the vertical height from an optical axis to the point where a light ray incident on the imaging lens at a maximum field of view enters the image plane.

In terms of lens surface shape, a convex surface or a concave surface means that the paraxial portion of the surface (portion near the optical axis) is convex or concave. A "pole-change point" on an aspheric surface means a point on the aspheric surface at which a tangential plane intersects the optical axis perpendicularly.

In order to address the above problem, the imaging lens according to the present invention is intended for use in an image sensor and includes elements arranged in order from an object side to an image side as follows: a first lens with positive refractive power having a convex surface on the object side; an aperture stop; a second lens with negative refractive power as a meniscus double-sided aspheric lens having a concave surface on the object side; and a third lens with positive refractive power as a meniscus double-sided aspheric lens having a concave surface on the image side. A diffractive optical surface is formed on the object-side surface of the second lens, and the aspheric object-side and image-side surfaces of the third lens have pole-change points off an optical axis. The imaging lens satisfies conditional expressions (1) to (4) below:

$$8.0 < fdoe/f < 26.0 \quad (1)$$

$$20 < vd1 - vd2 < 40 \quad (2)$$

$$20 < vd3 - vd2 < 40 \quad (3)$$

$$0.8 < ih/f < 0.95 \quad (4)$$

where
fdoe: focal length of the diffractive optical surface,
f: focal length of an overall optical system of the imaging lens,
vd1: Abbe number of the first lens at d-ray,
vd2: Abbe number of the second lens at d-ray,
vd3: Abbe number of the third lens at d-ray, and
ih: maximum image height.

In the imaging lens with the above configuration, positive, negative and positive refractive power constituent lenses are arranged in order from the object side to enhance the telephoto capability and make it easy to achieve low-profileness, and the distribution of refractive power to the constituent lenses is optimized and several aspheric surfaces are used to improve the imaging performance. As one requirement for a high-performance imaging lens, the capability to correct chromatic aberrations is very important. In the imaging lens with the above configuration, the lens materials are properly combined so that the negative second lens as a double-sided aspheric lens corrects chromatic aberrations which occur on the positive first lens, and the appropriate diffractive optical surface is formed on the concave object-side surface of the negative second lens in order to address the problem related to correction of chromatic aberrations. The both surfaces of the third lens, located nearest to the image plane, have an aspheric shape with pole-change points off the optical axis to control the angle of rays incident on the image sensor and correct field curvature and distortion in a balanced manner. Since the third lens has positive refractive power, the angle of rays incident on the third lens is reduced. This prevents the effective diameter of the second lens from becoming larger and makes it easier to suppress spherical aberrations and coma aberrations. Thus configured, the imaging lens has a low F-value, offers a wide field of view and corrects aberrations properly.

In the imaging lens with the above configuration, the diffractive optical surface is appropriately located to correct chromatic aberrations properly and deliver higher performance than conventional imaging lenses composed of three constituent lenses. As is generally known, a diffractive optical surface has a relief pattern which generates an optical path difference defined by an optical path difference function. Whereas the Abbe number of lens material at e-ray is usually from 25 to 80, the Abbe number of the diffractive optical surface at e-ray is about −3.3 or a reverse-sign number implying one-digit larger dispersion. In the imaging lens with the above configuration, not only the conventional technique of correcting chromatic aberrations using materials with at least two different dispersion ratios is adopted but also the diffractive optical surface is formed on the object-side surface of the second lens so that chromatic aberrations are corrected more effectively.

For higher diffraction efficiency, it is most desirable that the diffractive optical surface be located on a surface where a bundle of incident rays has a large area (footprint), that is, a surface near to the aperture stop. In the present invention, it is located on the object-side surface of the second lens near the aperture stop. Thus located, the diffractive optical surface suppresses flare. Specifically, rays exiting the first positive lens go in the converging direction and the angle of incidence on the cross sections of the stepped portions of orbicular zones of the diffractive optical surface formed on the object-side surface of the second lens is small. This minimizes diffuse reflection which occurs on the cross sections, and suppresses flare. The diffractive optical surface thus formed on the object-side surface of the second lens ensures high diffraction efficiency and corrects chromatic aberrations properly and suppresses flare properly. If a diffractive optical surface is formed on the third lens, the distance to the aperture stop would be larger and the area of the bundle of rays incident on the third lens would be smaller, making it necessary to increase the number of orbicular zones to improve the diffraction efficiency. In that case, more rays would reflect diffusely in the orbicular zones, which would result in increased flare and make it difficult to make a clear image. Furthermore, the function to correct chromatic aberrations on a tangential image surface would be insufficient. On the other hand, if a diffractive optical surface is formed on the object-side or the image-side surface of the first lens, the angle of incidence on the orbicular zones would be larger, which would lead to the problem of flare and unfavorably affect the external appearance.

The conditional expression (1) defines an appropriate range for the ratio of the focal length of the diffractive optical surface to the focal length of the overall optical system of the imaging lens, and indicates a condition to correct chromatic aberrations properly. If the value is above the upper limit of the conditional expression (1), the refractive power of the diffractive optical surface would be too weak to correct chromatic aberrations properly. If the value is below the lower limit of the conditional expression (1), again the refractive power of the diffractive optical surface would be too strong to correct chromatic aberrations properly.

The conditional expressions (2) and (3) define appropriate ranges for the difference between the Abbe numbers of the first and second lenses and the difference between the Abbe numbers of the third and second lenses, respectively, and indicate conditions to correct chromatic aberrations more effectively. When high-dispersion material is used for the second lens and low-dispersion material is used for the first and third lenses to satisfy the conditional expressions (2) and (3), chromatic aberrations can be corrected properly with the help of the diffractive optical surface's capability of correcting chromatic aberrations. In addition, the conditional expressions (2) and (3) suggest that the imaging lens can be made of inexpensive plastic materials and thus it can be manufactured at low cost as intended by the present invention.

The conditional expression (4) defines an appropriate range for the ratio of maximum image height to the focal length of the overall optical system of the imaging lens, which represents a field of view. As is generally known, the field of view is expressed by the equation $\omega=\tan^{-1}(ih/f)$ without consideration to the influence of aberrations, where $\omega$ denotes a field of view, ih denotes maximum image height, and f denotes the focal length of the overall optical system of the imaging lens. When the field of view $2\omega$ is within the range defined by the conditional expression (4), an object can be captured over a wide range from 77 to 87 degrees. If the value is above the upper limit of the conditional expression (4), the field of view would be too wide to correct aberrations properly. Specifically, coma aberrations would increase, which would worsen astigmatism and make it difficult to correct aberrations. If the value is below the lower limit of the conditional expression (4), the recent demand for a wide field of view could not be met though it would be advantageous in suppressing coma aberrations and improving performance.

Preferably, in the imaging lens with the above configuration, on the diffractive optical surface on the object side of the second lens, the number of orbicular zones in the lens surface effective diameter is 10 or less and the number of orbicular zones in an area through which rays converging on the optical axis pass is 5 or less.

The number of orbicular zones of the diffractive optical surface must be optimized to suppress flare caused by diffuse reflection on the cross sections of the stepped portions of the orbicular zones. Also, it is necessary to reduce the influence of flare on both incident rays parallel to the optical axis and off-axial incident rays. In the imaging lens according to the present invention, the number of orbicular zones in the lens effective diameter is 10 or less and the number of orbicular zones in the area through which rays converging on the optical axis pass is 5 or less, so that flare is suppressed.

More preferably, the number of orbicular zones of the diffractive optical surface is 8 or less in the lens effective diameter and 3 or less in the area through which rays converging on the optical axis pass.

Preferably, the imaging lens according to the present invention satisfies a conditional expression (5) below:

$$0.2 < t3/|r3| < 0.6 \qquad (5)$$

where
t3: distance on the optical axis from the aperture stop to the object-side surface of the second lens, and
r3: curvature radius of the object-side surface of the second lens.

The conditional expression (5) defines an appropriate range for the ratio of the distance on the optical axis from the aperture stop to the diffractive optical surface to the paraxial curvature radius of the diffractive optical surface, which represents the positional relation between the aperture stop and the diffractive optical surface, and indicates a condition to suppress flare caused by multi-order diffracted light. In adopting a diffractive optical surface, in order to make a clear image, it is important to keep the angle of incident rays on the diffractive optical surface small and suppress flare caused by multi-order diffracted light. If the value is above the upper limit of the conditional expression (5), the distance between the aperture stop and the diffractive optical surface would increase and the angle of off-axial rays incident on the diffractive optical surface would be small, which would be advantageous in suppressing flare. In that case, however, the distance between the first and second lenses must be increased, making it difficult to achieve low-profileness. If the value is below the lower limit of the conditional expression (5), the distance between the aperture stop and the diffractive optical surface would be too small and the angle of off-axial rays incident on the diffractive optical surface would be large, resulting in increased flare, though it would be advantageous in achieving low-profileness.

Preferably, the imaging lens according to the present invention satisfies conditional expressions (6) and (7) below:

$$-1.2 < (r1+r2)/(r1-r2) < -0.6 \qquad (6)$$

$$-7.0 < (r3+r4)/(r3-r4) < -1.2 \qquad (7)$$

where
r1: curvature radius of the object-side surface of the first lens,
r2: curvature radius of the image-side surface of the first lens,
r3: curvature radius of the object-side surface of the second lens, and
r4: curvature radius of the image-side surface of the second lens.

The conditional expression (6) defines an appropriate range for the ratio of the sum of the curvature radii of the object-side and image-side surfaces of the first lens to the difference between the curvature radii, which represents the paraxial shape of the first lens, and indicates a condition to offer a wide field of view and suppress geometric optical aberrations, particularly coma aberrations. In the range defined by the conditional expression (6), the first lens has a meniscus shape with a convex surface on the object side or a biconvex shape. If the value is above the upper limit of the conditional expression (6) and the first lens has a biconvex shape, the negative refractive power of the second lens would have to be increased to balance the increased positive refractive power of the first lens. In that case, spherical aberrations, off-axial coma aberrations, astigmatism, and chromatic aberrations of magnification would increase, making it difficult to correct various aberrations caused by the wide field of view. On the other hand, if the value is below the lower limit of the conditional expression (6) and the first lens has a meniscus shape, the curvature radius of the object-side surface of the first lens would be smaller. Therefore, although it would be easier to receive rays over a wide field of view, undesirably the manufacturing error sensitivity would increase and spherical aberrations, coma aberrations and astigmatism would worsen.

The conditional expression (7) defines an appropriate range for the ratio of the sum of the curvature radii of the object-side and image-side surfaces of the second lens to the difference between the curvature radii, which represents the paraxial shape of the second lens, and indicates a condition to correct chromatic aberrations properly. If the value is above the upper limit of the conditional expression (7), the negative refractive power of the second lens would be stronger and the focal length and total track length would be larger, making it difficult to achieve a wide field of view and low-profileness, though it would be advantageous in correcting chromatic aberrations. Furthermore, the positive refractive power of the first lens would have to be increased to offset the negative refractive power and spherical aberrations, coma aberrations and astigmatism would worsen. If the value is below the lower limit of the conditional expression (7), the negative refractive power of the second lens would be weaker and the focal length and total track length would be shorter, which would be advantageous in achieving a wide field of view and low-profileness. However, the dependence on the diffractive optical surface for correction of chromatic aberrations would be high and it would be necessary to increase the refractive power of the surface. Therefore, the number of orbicular zones would have to be increased and undesirably flare would be more likely to occur.

Preferably, the imaging lens according to the present invention satisfies conditional expressions (8) to (10) below:

$$1.0 < f1/f < 1.5 \qquad (8)$$

$$-6.0 < f2/f < -1.0 \qquad (9)$$

$$0.7 < f3/f < 2.4 \qquad (10)$$

where
f1: focal length of the first lens,
f2: focal length of the second lens including the diffractive optical surface,
f3: focal length of the third lens, and
f: focal length of the overall optical system of the imaging lens.

The conditional expression (8) indicates a condition to ensure compactness and suppress coma aberrations and chromatic aberrations of magnification within appropriate ranges. If the value is above the upper limit of the conditional expression (8), the refractive power of the first lens would be too weak to achieve low-profileness and astigmatism would worsen. If the value is below the lower limit of the conditional expression (8), coma aberrations would tend to increase and thus it would be difficult to correct chromatic aberrations of magnification, though it would be advantageous in achieving low-profileness.

The conditional expression (9) defines an appropriate range for the ratio of the focal length of the second lens including the diffractive optical surface to the focal length of the overall optical system of the imaging lens, and indicates a condition to achieve low-profileness and correct chromatic aberrations properly. If the value is above the upper limit of the conditional expression (9), the negative refractive power of the second lens would be too strong to achieve low-profileness. If the value is below the lower limit of the conditional expression (9), the negative refractive power of the second lens would be too weak for the second lens to correct chromatic aberrations properly.

The conditional expression (10) indicates a condition to enable rays to enter the image senor at an appropriate angle, correct distortion properly and ensure an appropriate back focus. If the value is above the upper limit of the conditional expression (10), the refractive power of the third lens would be weaker, which would be advantageous in ensuring an appropriate back focus. However, it would be difficult to ensure a short total track length and chromatic aberrations of magnification would tend to worsen. If the value is below the lower limit of the conditional expression (10), it would be difficult to ensure an appropriate back focus and also to control the angle of incident rays on the image sensor. Furthermore, it would be difficult to correct distortion.

Regarding the relation in focal length among the first to third lenses, preferably, the imaging lens satisfies a conditional expression (11) below:

$$-1.7 < f2/(f1+f3) < -0.5 \qquad (11)$$

where
f1: focal length of the first lens,
f2: focal length of the second lens including the diffractive optical surface, and
f3: focal length of the third lens.

The conditional expression (11) defines an appropriate range for the ratio of the focal length of the second lens to the sum of the focal lengths of the first and third lenses, which represents the relation of the negative refractive power of the second lens to the composite positive refractive power of the first and third lenses, and indicates a condition to correct chromatic aberrations properly and ensure low-profileness. If the value is above the upper limit of the conditional expression (11), the negative refractive power of the second lens would be relatively too strong to ensure low-profileness, though it would be advantageous in correcting chromatic aberrations. If the value is below the lower limit of the conditional expression (11), the negative refractive power of the second lens would be relatively too weak to correct chromatic aberrations properly, though it would be advantageous in ensuring low-profileness.

DETAILED DESCRIPTION OF THE PREFERRED EMBODIMENTS

Hereinafter, the preferred embodiment of the present invention will be described in detail referring to the accompanying drawings.

Figure 13:
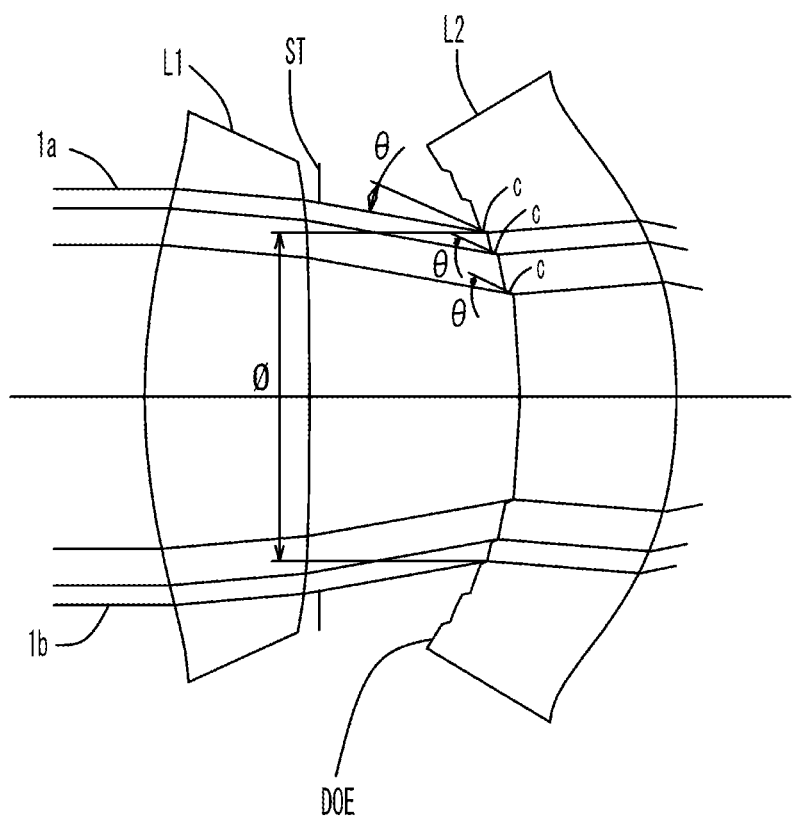
FIG. 13 is a schematic view showing the shape of a diffractive optical surface.

FIGS. 1, 3, 5, 7, 9, and 11 are schematic views showing the general configurations of the imaging lenses in Examples 1 to 6 according to this embodiment of the present invention, respectively. Since all these examples have the same basic lens configuration, the general configuration of an imaging lens according to this embodiment is explained below referring to the schematic view of Example 1 and a schematic view of FIG. 13 showing the shape of a diffractive optical surface.

Figure 1:
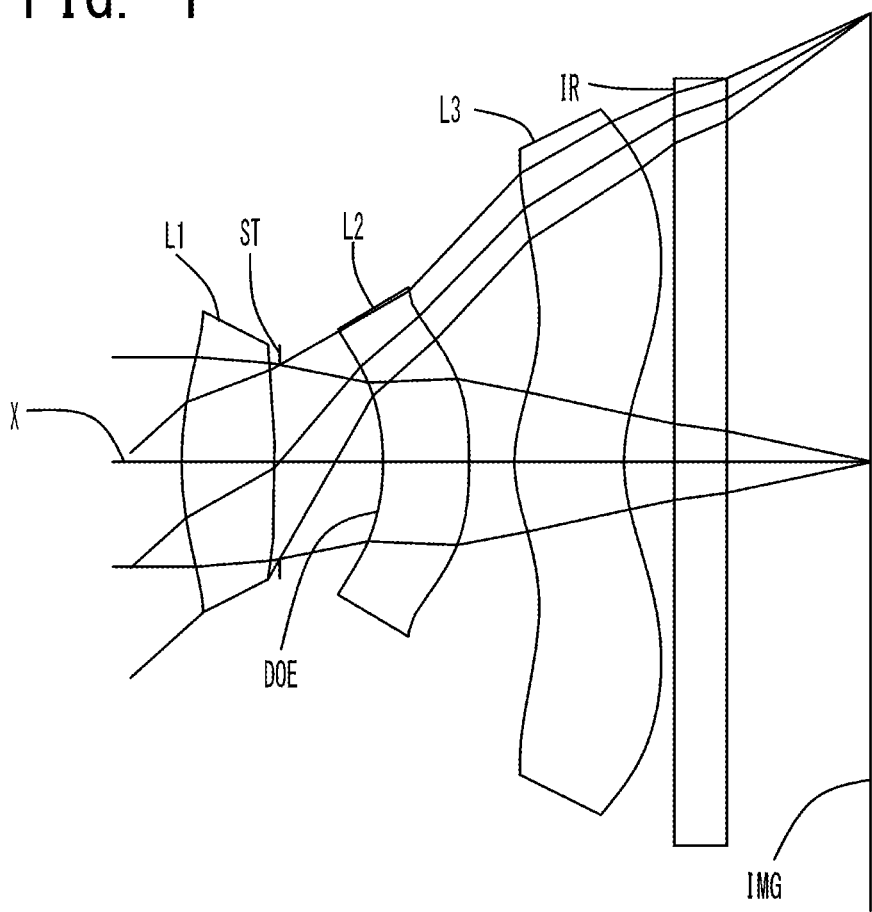
FIG. 1 is a schematic view showing the general configuration of an imaging lens in Example 1 of the present invention.

As shown in FIG. 1, the imaging lens according to the present invention includes, in order from an object side to an image side, a first lens L1 with positive refractive power having a convex surface on the object side, an aperture stop ST, a second lens L2 with negative refractive power as a meniscus double-sided aspheric lens having a concave surface on the object side, and a third lens L3 with positive refractive power as a meniscus double-sided aspheric lens having a concave surface on the image side. The second lens L2 has a diffractive optical surface DOE on the object side and the third lens L3 has pole-change points off the optical axis X on the aspheric object-side and image-side surfaces. A filter IR such as an infrared cut filter is located between the third lens L3 and an image plane IMG. The filter IR is omissible. In this embodiment, the values of total track length and back focus are calculated on the assumption that a thickness of the filter IR is regarded as an air-equivalent distance, that is, an equivalent air distance.

In the imaging lens according to this embodiment, positive, negative and positive refractive power constituent lenses are arranged in order from the object side to enhance the telephoto capability to make it easy to achieve low-profileness, and refractive power is optimally distributed to the constituent lenses and several aspheric surfaces are used to improve the imaging performance. In the imaging lens according to this embodiment, in order to correct chromatic aberrations properly, the first lens L1 of low-dispersion material and the second lens L2 of high-dispersion material are appropriately combined so that the second lens L2, a double-sided aspheric lens with negative refractive power, properly corrects chromatic aberrations which occur on the first lens L1 with positive refractive power, and the appropriate diffractive optical surface DOE is formed on the object-side surface of the second lens L2 with negative refractive power in order to solve the problem related to correction of chromatic aberrations which has been difficult to address in the past. The both surfaces of the third lens L3, located nearest to the image plane, have an aspheric shape with pole-change points off the optical axis X, are used to control the angle of rays incident on the image plane IMG appropriately, and correct field curvature and distortion in a balanced manner. In addition, since the third lens L3 has positive refractive power, the angle of rays incident on the third lens L3 is reduced so that the effective diameter of the second lens L2 can be smaller. Consequently, spherical aberrations and coma aberrations which occur on the second lens L2 are suppressed.

In Example 1, the first lens L1 is a biconvex lens. However, instead it may be a meniscus lens with positive refractive power having a convex surface on the object side or a flat convex lens having a flat surface on the image side.

Since the diffractive optical surface DOE on the object-side surface of the second lens L2 is located near the aperture stop ST as shown in FIG. 13, a bundle of rays ø exiting the aperture stop ST enters the second lens L2 with a wide incidence area and thus its diffraction efficiency is increased. When d denotes orbicular zone depth, λ denotes design wavelength and n denotes the refractive index of lens material, the relation among them is expressed by $d=\lambda/(n-1)$ and the orbicular zone depth is very small at about 1 μm. In the design of an ordinary diffractive optical surface, each orbicular zone is in the form of a sharp edge and its cross section C has a sectional shape parallel to the optical axis X. However, actually, since round chamfering is done in the machining process, an edge is not formed and it is desirable that the cross section c be inclined so as to ensure mold releasability. As a consequence, the actual shape of the orbicular zone is an inclined surface with a round tip. The relation between the direction of this inclination and the rays incident on the diffractive optical surface DOE is very important in suppressing flare. Specifically, incident rays 1a, 1b and so on parallel to the lens system, after exiting the first lens L1, go in a direction toward the optical axis X. On the other hand, the cross section c of an orbicular zone of the diffractive optical surface DOE is a surface inclined toward the object side in a direction away from the optical axis X. Therefore, the angles between the incident rays 1a, 1b and so on and the cross sections c are such that they seem almost parallel to each other and the angle θ of a ray incident on the cross section c is small. This minimizes diffuse reflection which occurs on the cross sections c of the orbicular zones and suppresses flare.

On the diffractive optical surface DOE on the object-side surface of the second lens L2, the total number of orbicular zones in the effective diameter is 10 or less and the number of orbicular zones at zero image height in the area through which a bundle of rays passes is 5 or less. When the number of orbicular zones is limited to 5 or less for a bundle of rays at zero image height, that is, a bundle of rays with the largest luminous energy which enters the optical system, the amount of diffuse reflection on the cross sections c is further reduced. Off-axial rays tend to enter the cross sections c at a wide incidence angle but their luminous energy is small, so that the influence of diffuse reflection is smaller than with the bundle of rays at zero image height. In this embodiment, flare of off-axial rays is also suppressed by limiting the number of orbicular zones in the effective diameter to 10 or less.

When the imaging lens according to this embodiment satisfies conditional expressions (1) to (11) below, it brings about advantageous effects:

$$8.0 < fdoe/f < 26.0 \tag{1}$$

$$20 < vd1 - vd2 < 40 \tag{2}$$

$$20 < vd3 - vd2 < 40 \tag{3}$$

$$0.8 < ih/f < 0.95 \tag{4}$$

$$0.2 < t3/|r3| < 0.6 \tag{5}$$

$$-1.2 < (r1+r2)/(r1-r2) < -0.6 \tag{6}$$

$$-7.0 < (r3+r4)/(r3-r4) < -1.2 \tag{7}$$

$$1.0 < f1/f < 1.5 \tag{8}$$

$$-6.0 < f2/f < -1.0 \tag{9}$$

$0.7 < f3/f < 2.4$  (10)

$-1.7 < f2/(f1+f3) < -0.5$  (11)

where
f: focal length of the overall optical system of the imaging lens,
fdoe: focal length of the diffractive optical surface DOE,
vd1: Abbe number of the first lens L1 at d-ray,
vd2: Abbe number of the second lens L2 at d-ray,
vd3: Abbe number of the third lens L3 at d-ray,
ih: maximum image height,
f1: focal length of the first lens L1,
f2: focal length of the second lens L2 including the diffractive optical surface DOE,
f3: focal length of the third lens L3,
t3: distance on the optical axis X from the aperture stop ST to the object-side surface of the second lens L2,
r1: curvature radius of the object-side surface of the first lens L1,
r2: curvature radius of the image-side surface of the first lens L1,
r3: curvature radius of the object-side surface of the second lens L2, and
r4: curvature radius of the image-side surface of the second lens L2.

When the imaging lens according to this embodiment satisfies conditional expressions (1a) to (11a) below, it brings about more advantageous effects:

$9.0 < fdoe/f < 26.0$  (1a)

$25 < vd1-vd2 < 35$  (2a)

$25 < vd3-vd2 < 35$  (3a)

$0.8 < ih/f < 0.95$  (4a)

$0.2 < t3/|r3| < 0.6$  (5a)

$-1.0 < (r1+r2)/(r1-r2) < -0.8$  (6a)

$-7.0 < (r3+r4)/(r3-r4) < -1.5$  (7a)

$1.0 < f1/f < 1.3$  (8a)

$-5.5 < f2/f < -1.2$  (9a)

$0.9 < f3/f < 2.3$  (10a)

$-1.6 < f2/(f1+f3) < -0.55$.  (11a)

The signs in the above conditional expressions have the same meanings as in the preceding paragraph.

When the imaging lens according to this embodiment satisfies conditional expressions (1b) to (11b) below, it brings about particularly advantageous effects:

$9.01 \leq fdoe/f \leq 24.96$  (1b)

$28 < vd1-vd2 < 35$  (2b)

$28 < vd3-vd2 < 35$  (3b)

$0.8 < ih/f 0.93$  (4b)

$0.33 \leq t3/|r3| \leq 0.46$  (5b)

$-1.0 \leq (r1+r2)/(r1-r2) \leq -0.85$  (6b)

$-6.58 \leq (r3+r4)/(r3-r4) \leq -1.78$  (7b)

$1.18 \leq f1/f \leq 1.26$  (8b)

$-5.26 \leq f2/f \leq -1.36$  (9b)

$1.04 \leq f3/f \leq 2.16$  (10b)

$-1.54 \leq f2/(f1+f3) \leq -0.61$.  (11b)

The signs in the above conditional expressions have the same meanings as in the preceding paragraph.

According to this embodiment, the imaging lens is low-profile with a ratio to diagonal of 0.8 or less and offers high brightness with an F-value of 2.4 or less and a wide field of view (2ω) of 80 degrees or more and provides high resolution.

In this embodiment, all the lens surfaces are aspheric. The aspheric shapes of these lens surfaces are expressed by Equation 1, where Z denotes an axis in the optical axis direction, H denotes a height perpendicular to the optical axis X, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

In this embodiment, the diffractive optical surface DOE formed on the object side of the second lens L2 is expressed by Equation 2, where P denotes a phase difference and $B_{2i}$ denotes a phase difference function coefficient (i=1 to 8).

$$P = \sum_{i=1}^{8} B_{2i} H^{2i}$$

Equation 2

Next, examples of the imaging lens according to this embodiment will be explained. In each example, f denotes the focal length of the overall optical system of the imaging lens, Fno denotes an F-number, ω denotes a half field of view, ih denotes a maximum image height, and TLA and bf respectively denote total track length and back focus with the thickness of the filter IR regarded as the equivalent air distance. i denotes a surface number counted from the object side, r denotes a curvature radius, d denotes the distance on the optical axis X between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface. As for a diffractive optical surface, "DOE" after surface number i indicates that the surface concerned is a diffractive optical surface DOE.

Example 1

The basic lens data of Example 1 is shown in Table 1 below.

TABLE 1 in mm
f = 1.97
Fno = 2.4
ω(°) = 42.0
ih = 1.79
TLA = 2.68
bf = 0.91

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.420 | 0.371 | 1.544 | 55.57 |
| 2* | −17.611 | 0.020 | | |
| 3 (Stop) | Infinity | 0.412 | | |
| 4*DOE | −1.044 | 0.344 | 1.635 | 23.97 |
| 5* | −2.940 | 0.181 | | |
| 6* | 0.551 | 0.440 | 1.544 | 55.57 |
| 7* | 0.713 | 0.200 | | |
| 8 | Infinity | 0.210 | 1.517 | 64.20 |
| 9 | Infinity | 0.568 | | |
| Image Plane | | | | |

Constituent Lens Data

| Lens | Start Surface | Focal Length |
|---|---|---|
| 1 | 1 | 2.43 |
| 2 | 4 | −3.22 |
| 3 | 6 | 2.27 |

| Diffractive Optical Surface | Focal Length |
|---|---|
| 4th Surface | 17.717 |

Aspheric Surface Data

| | 1st Surface | 2nd Surface | 4th Surface | 5th Surface | 6th Surface | 7th Surface |
|---|---|---|---|---|---|---|
| k   | −3.752E+00 | −5.889E+01 | 2.413E+00 | −1.207E+01 | −5.830E+00 | −1.401E+00 |
| A4  | 1.486E−01  | −3.292E−01 | −1.413E+00 | −4.306E+00 | −8.741E−01 | −1.318E+00 |
| A6  | −2.348E+00 | −1.013E+00 | 1.623E+01 | 2.760E+01 | 3.328E−01 | 1.977E+00 |
| A8  | 1.198E+01  | 8.041E+00  | −1.443E+02 | −1.414E+02 | 1.674E+00 | −2.157E+00 |
| A10 | −3.777E+01 | −5.494E+01 | 7.709E+02 | 4.777E+02 | −3.040E+00 | 1.612E+00 |
| A12 | 4.122E+01  | 1.642E+02  | −1.944E+03 | −9.847E+02 | 2.340E+00 | −7.655E−01 |
| A14 | 0.000E+00  | −1.112E+02 | 2.028E+03 | 1.173E+03 | −8.752E−01 | 2.021E−01 |
| A16 | 0.000E+00  | 0.000E+00  | 0.000E+00 | −6.165E+02 | 1.297E−01 | −2.217E−02 |

Phase Difference Function Coefficient

| C2 | C4 | C6 | C8 | C10 | C12 | C14 | C16 |
|---|---|---|---|---|---|---|---|
| −3.021E+02 | −2.831E+02 | 3.029E+03 | 2.182E+03 | −8.379E+03 | −3.684E+04 | 2.477E+04 | 0.000E+00 |

Regarding the imaging lens in Example 1, Table 7 shows the values related to the conditional expressions (1) to (11) and Table 8 shows the number of orbicular zones of the diffractive optical surface DOE. As shown in Table 7, the imaging lens in Example 1 satisfies all the conditional expressions (1) to (11). The number of orbicular zones in the effective diameter is 8 and the number of orbicular zones in the area through which rays converging on the optical axis pass is 4, which satisfies the condition to suppress flare.

Figure 2:
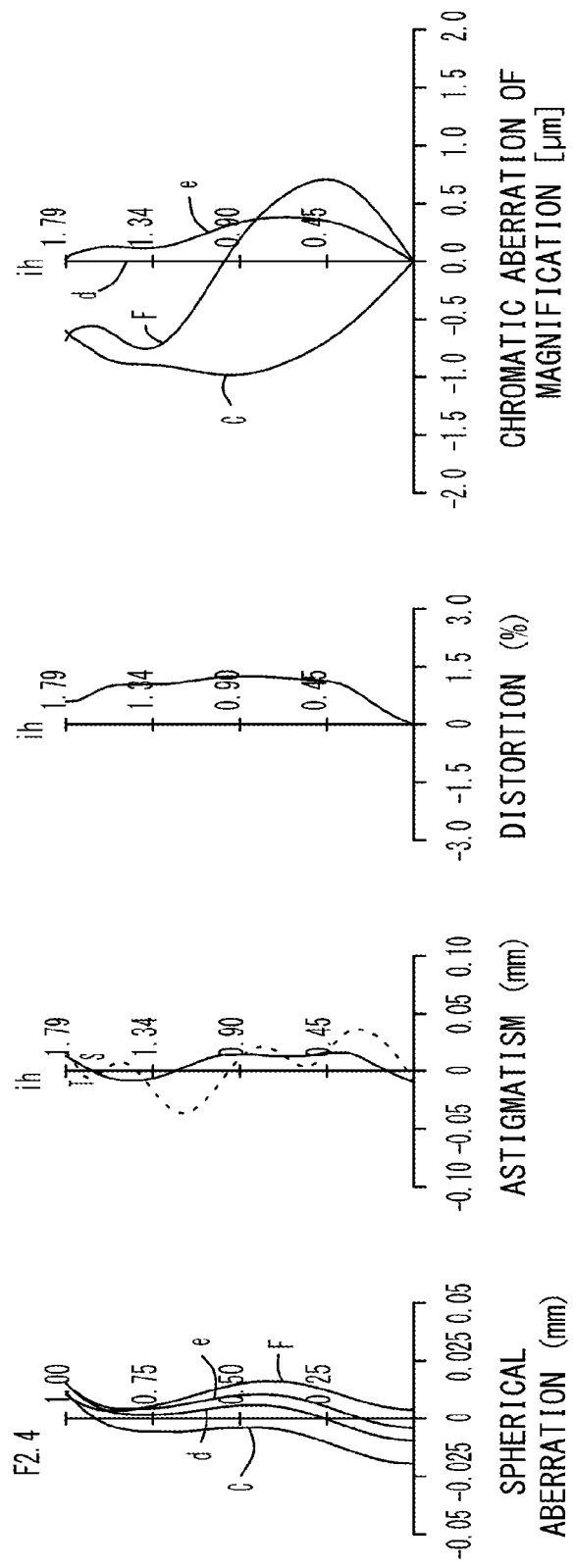
FIG. 2 shows spherical aberration, astigmatism, distortion, and chromatic aberration of magnification of the imaging lens in Example 1.
Figure 3:
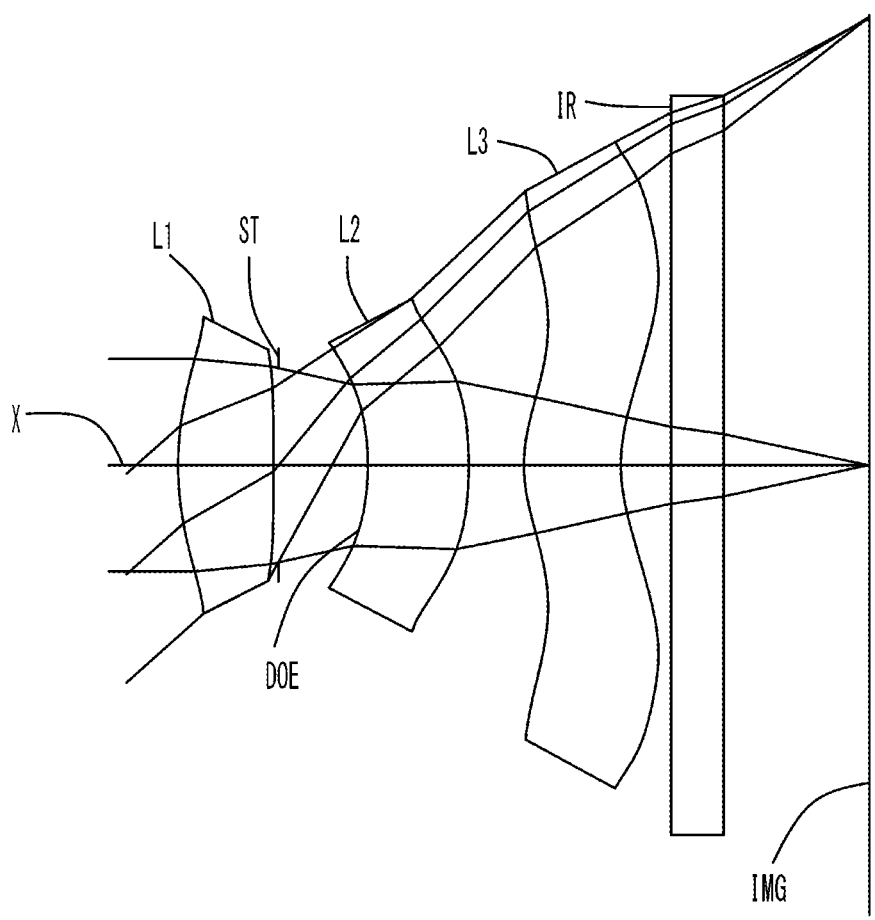
FIG. 3 is a schematic view showing the general configuration of an imaging lens in Example 2 of the present invention.

FIG. 2 shows spherical aberration (mm), astigmatism (mm), distortion (%), and chromatic aberration of magnification (μm) of the imaging lens in Example 1. The spherical aberration diagram shows the amount of aberration at wavelengths of F-ray (486 nm), e-ray (546 nm), d-ray (587 nm), and C-ray (656 nm). The astigmatism diagram shows the amount of aberration at d-ray on sagittal image surface S and the amount of aberration at d-ray on tangential image surface T and the diagram of chromatic aberration of magnification shows the amount of aberration at wavelengths of F-ray (486 nm), e-ray (546 nm), and C-ray (656 nm) with respect to d-ray as the reference wavelength, (the same is true for FIGS. 4, 6, 8, 10, and 12).

As shown in FIG. 2, the imaging lens in Example 1 corrects chromatic aberrations and other aberrations properly. It is sufficiently low-profile with a ratio to diagonal of 0.75 and offers high brightness with an F-value of 2.4 and a wide field of view (2ω) of 84 degrees.

Example 2

The basic lens data of Example 2 is shown in Table 2 below.

TABLE 2 in mm
f = 2.00
Fno = 2.4
ω(°) = 41.5
ih = 1.79
TLA = 2.69
bf = 0.94

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.283 | 0.381 | 1.544 | 55.57 |
| 2* | Infinity | 0.021 | | |
| 3 (Stop) | Infinity | 0.356 | | |
| 4*DOE | −1.091 | 0.402 | 1.635 | 23.97 |
| 5* | −2.150 | 0.221 | | |
| 6* | 0.590 | 0.387 | 1.544 | 55.57 |
| 7* | 0.671 | 0.200 | | |
| 8 | Infinity | 0.210 | 1.517 | 64.20 |
| 9 | Infinity | 0.578 | | |
| Image Plane | | | | |

Constituent Lens Data

| Lens | Start Surface | Focal Length |
|---|---|---|
| 1 | 1 | 2.36 |
| 2 | 4 | −5.09 |
| 3 | 6 | 3.34 |

| Diffractive Optical Surface | Focal Length |
|---|---|
| 4th Surface | 19.445 |

Aspheric Surface Data

| | 1st Surface | 2nd Surface | 4th Surface | 5th Surface | 6th Surface | 7th Surface |
|---|---|---|---|---|---|---|
| k | −1.602E+00 | −5.889E+01 | 3.483E+00 | −2.362E+02 | −5.127E+00 | −1.701E+00 |
| A4 | 1.530E−01 | −4.693E−01 | −1.261E+00 | −5.136E+00 | −9.216E−01 | −1.350E+00 |
| A6 | −2.710E+00 | 2.518E+00 | 1.642E+01 | 3.903E+01 | 4.314E−01 | 2.200E+00 |
| A8 | 1.431E+01 | −3.971E+01 | −1.799E+02 | −2.314E+02 | 1.176E+00 | −2.595E+00 |
| A10 | −4.399E+01 | 2.610E+02 | 1.177E+03 | 9.022E+02 | −2.184E+00 | 2.077E+00 |
| A12 | 4.513E+01 | −8.748E+02 | −3.609E+03 | −2.141E+03 | 1.712E+00 | −1.053E+00 |
| A14 | 0.000E+00 | 1.221E+03 | 4.549E+03 | 2.829E+03 | −6.677E−01 | 3.004E−01 |
| A16 | 0.000E+00 | 0.000E+00 | 0.000E+00 | −1.581E+03 | 1.047E−01 | −3.620E−02 |

Phase Difference Function Coefficient

| C2 | C4 | C6 | C8 | C10 | C12 | C14 | C16 |
|---|---|---|---|---|---|---|---|
| −2.752E+02 | 1.468E+02 | −1.020E+04 | 5.237E+04 | 5.244E+04 | −1.016E+05 | −5.171E+05 | −4.089E+06 |

Regarding the imaging lens in Example 2, Table 7 shows the values related to the conditional expressions (1) to (11) and Table 8 shows then number of orbicular zones of the diffractive optical surface DOE. As shown in Table 7, the imaging lens in Example 2 satisfies all the conditional expressions (1) to (11). The number of orbicular zones in the effective diameter is 9 and the number of orbicular zones in the area through which rays converging on the optical axis pass is 4, which satisfies the condition to suppress flare.

Figure 4:
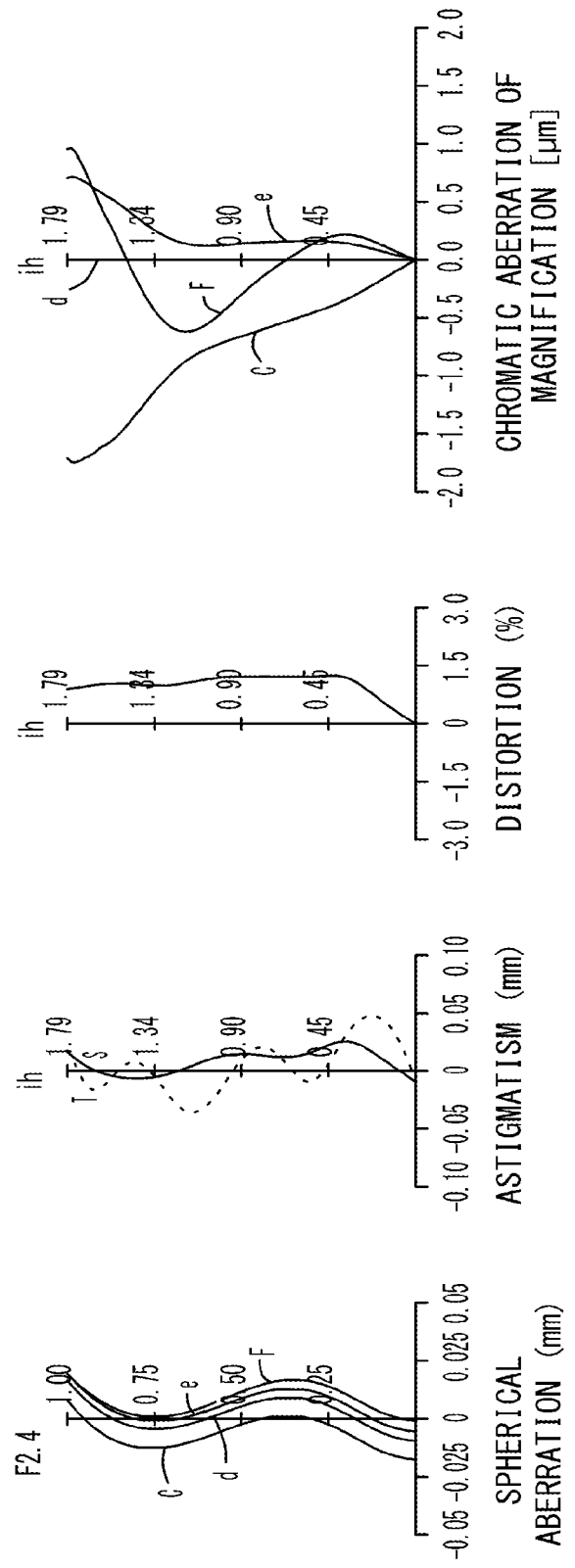
FIG. 4 shows spherical aberration, astigmatism, distortion, and chromatic aberration of magnification of the imaging lens in Example 2.
Figure 5:
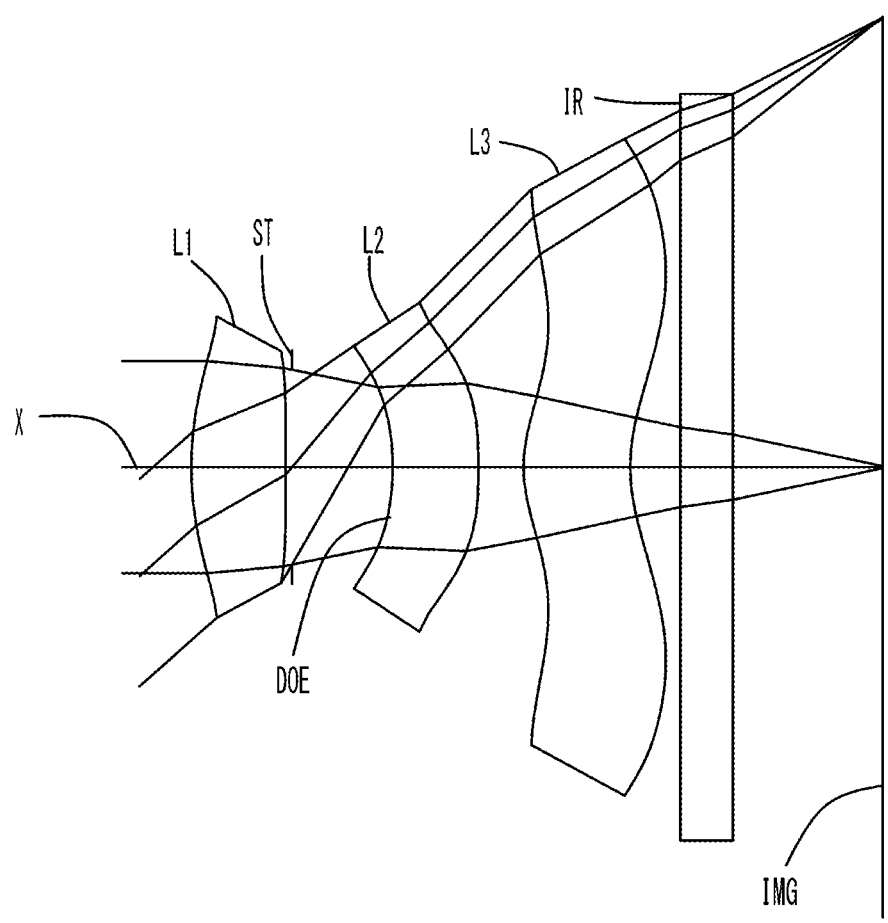
FIG. 5 is a schematic view showing the general configuration of an imaging lens in Example 3 of the present invention.

FIG. 4 shows spherical aberration (mm), astigmatism (mm), distortion (%), and chromatic aberration of magnification (μm) of the imaging lens in Example 2. As shown in FIG. 4, the imaging lens in Example 2 also corrects chromatic aberrations and other aberrations properly. It is sufficiently low-profile with a ratio to diagonal of 0.75, and offers high brightness with an F-value of 2.4 and a wide field of view (2w) of 83 degrees.

Example 3

The basic lens data of Example 3 is shown in Table 3 below.

TABLE 3 in mm
f = 2.00
Fno = 2.4
ω(°) = 41.5
ih = 1.79
TLA = 2.69
bf = 0.94

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.338 | 0.377 | 1.544 | 55.57 |
| 2* | Infinity | 0.025 | | |
| 3 (Stop) | Infinity | 0.401 | | |
| 4*DOE | −1.110 | 0.343 | 1.635 | 23.97 |
| 5* | −3.494 | 0.180 | | |
| 6* | 0.541 | 0.425 | 1.544 | 55.57 |
| 7* | 0.724 | 0.200 | | |
| 8 | Infinity | 0.210 | 1.517 | 64.20 |
| 9 | Infinity | 0.589 | | |
| Image Plane | | | | |

Constituent Lens Data

| Lens | Start Surface | Focal Length |
|---|---|---|
| 1 | 1 | 2.46 |
| 2 | 4 | −2.99 |
| 3 | 6 | 2.16 |

| Diffractive Optical Surface | Focal Length |
|---|---|
| 4th Surface | 28.262 |

Aspheric Surface Data

| | 1st Surface | 2nd Surface | 4th Surface | 5th Surface | 6th Surface | 7th Surface |
|---|---|---|---|---|---|---|
| k | −8.957E−01 | −5.881E+01 | 3.080E+00 | 7.707E+00 | −6.127E+00 | −1.150E+00 |
| A4 | 1.270E−02 | −3.551E−01 | −1.760E+00 | −4.727E+00 | −8.152E−01 | −1.407E+00 |
| A6 | −1.480E+00 | 1.077E+00 | 2.250E+01 | 3.484E+01 | 2.311E−01 | 2.065E+00 |
| A8 | 7.016E+00 | −2.269E+01 | −2.285E+02 | −2.013E+02 | 1.516E+00 | −2.328E+00 |
| A10 | −2.257E+01 | 1.625E+02 | 1.339E+03 | 7.669E+02 | −2.488E+00 | 1.825E+00 |
| A12 | 2.394E+01 | −5.645E+02 | −3.805E+03 | −1.796E+03 | 1.806E+00 | −9.086E−01 |
| A14 | 0.000E+00 | 8.057E+02 | 4.421E+03 | 2.385E+03 | −6.498E−01 | 2.527E−01 |
| A16 | 0.000E+00 | 0.000E+00 | 0.000E+00 | −1.357E+03 | 9.370E−02 | −2.948E−02 |

Phase Difference Function Coefficient

| C2 | C4 | C6 | C8 | C10 | C12 | C14 | C16 |
|---|---|---|---|---|---|---|---|
| −1.894E+02 | −5.100E+02 | −7.771E+03 | 4.863E+04 | 1.030E+05 | −1.979E+05 | −4.731E+06 | 1.209E+07 |

Regarding the imaging lens in Example 3, Table 7 shows the values related to the conditional expressions (1) to (11) and Table 8 shows then number of orbicular zones of the diffractive optical surface DOE. As shown in Table 7, the imaging lens in Example 3 satisfies all the conditional expressions (1) to (11). The number of orbicular zones in the effective diameter is 10 and the number of orbicular zones in the area through which rays converging on the optical axis pass is 4, which satisfies the condition to suppress flare.

Figure 6:
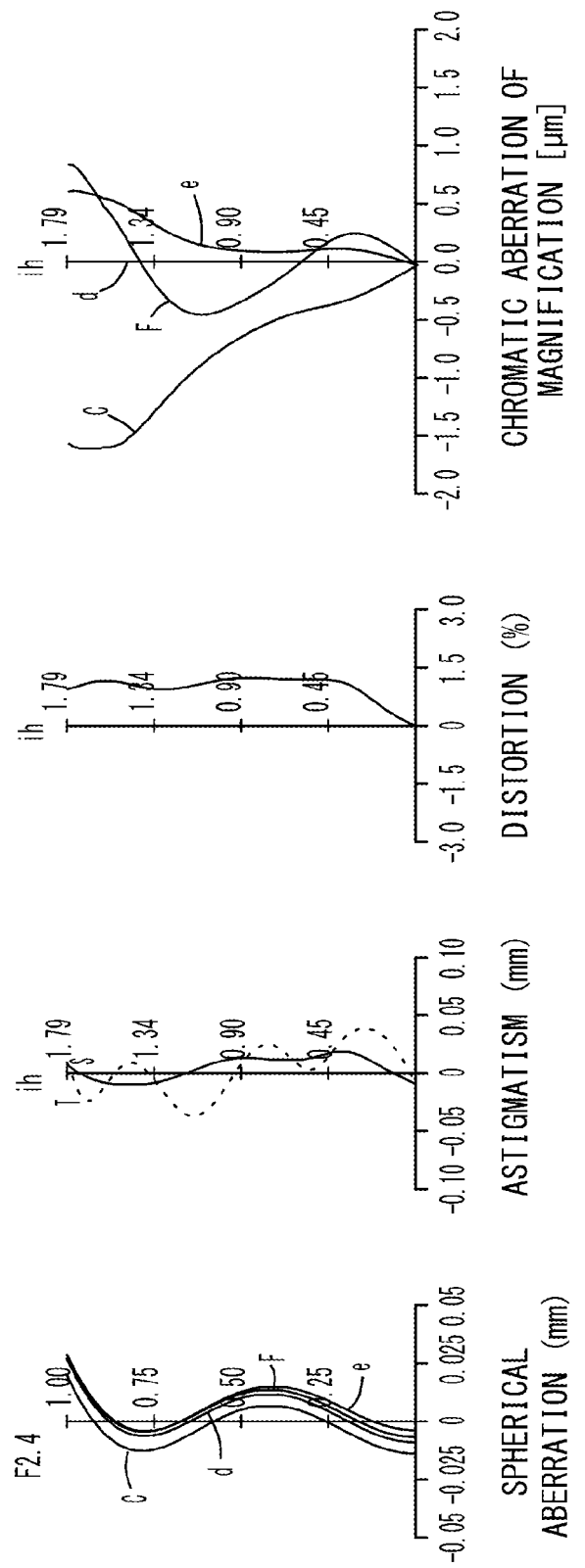
FIG. 6 shows spherical aberration, astigmatism, distortion, and chromatic aberration of magnification of the imaging lens in Example 3.
Figure 7:
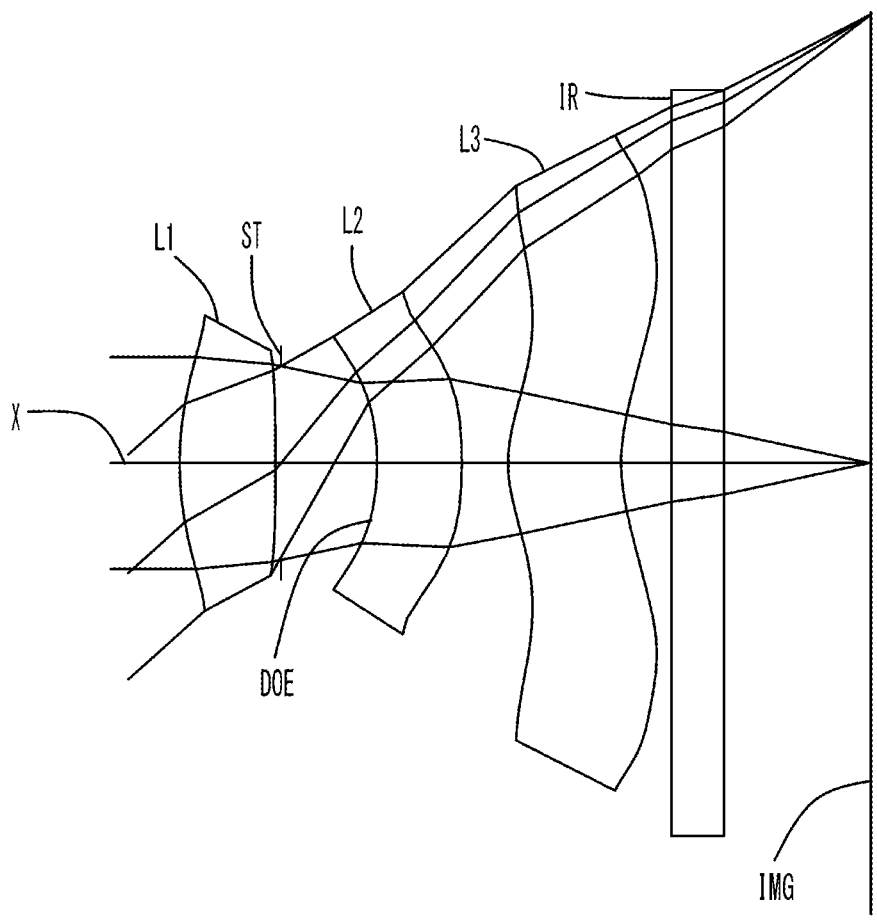
FIG. 7 is a schematic view showing the general configuration of an imaging lens in Example 4 of the present invention.

FIG. 6 shows spherical aberration (mm), astigmatism (mm), distortion (%), and chromatic aberration of magnification (μm) of the imaging lens in Example 3. As shown in FIG. 6, the imaging lens in Example 3 also corrects chromatic aberrations and other aberrations properly. It is sufficiently low-profile with a ratio to diagonal of 0.75 and offers high brightness with an F-value of 2.4 and a wide field of view (2ω) of 83 degrees.

Example 4

The basic lens data of Example 4 is shown in Table 4 below.

TABLE 4 in mm
f = 2.00
Fno = 2.3
ω(°) = 41.5
ih = 1.79
TLA = 2.68
bf = 0.92

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.308 | 0.381 | 1.544 | 55.57 |
| 2* | Infinity | 0.023 | | |
| 3 (Stop) | Infinity | 0.383 | | |
| 4*DOE | −1.097 | 0.338 | 1.635 | 23.97 |
| 5* | −3.917 | 0.186 | | |
| 6* | 0.545 | 0.452 | 1.544 | 55.57 |
| 7* | 0.746 | 0.200 | | |
| 8 | Infinity | 0.210 | 1.517 | 64.20 |
| 9 | Infinity | 0.586 | | |
| Image Plane | | | | |

Constituent Lens Data

| Lens | Start Surface | Focal Length |
|---|---|---|
| 1 | 1 | 2.41 |
| 2 | 4 | −2.72 |
| 3 | 6 | 2.08 |

| Diffractive Optical Surface | Focal Length |
|---|---|
| 4th Surface | 32.568 |

Aspheric Surface Data

| | 1st Surface | 2nd Surface | 4th Surface | 5th Surface | 6th Surface | 7th Surface |
|---|---|---|---|---|---|---|
| k | −1.313E+00 | −9.900E+01 | 3.393E+00 | 1.806E+01 | −6.210E+00 | −1.373E+00 |
| A4 | 9.412E−02 | −4.348E−01 | −2.086E+00 | −5.024E+00 | −8.623E−01 | −1.300E+00 |
| A6 | −2.377E+00 | 2.055E+00 | 2.767E+01 | 3.860E+01 | 5.006E−01 | 1.988E+00 |
| A8 | 1.267E+01 | −3.245E+01 | −2.855E+02 | −2.327E+02 | 9.862E−01 | −2.278E+00 |
| A10 | −3.970E+01 | 2.088E+02 | 1.757E+03 | 9.269E+02 | −2.006E+00 | 1.794E+00 |
| A12 | 4.237E+01 | −6.865E+02 | −5.392E+03 | −2.258E+03 | 1.604E+00 | −8.986E−01 |
| A14 | 0.000E+00 | 9.721E+02 | 6.919E+03 | 3.091E+03 | −6.241E−01 | 2.526E−01 |
| A16 | 0.000E+00 | 0.000E+00 | 0.000E+00 | −1.800E+03 | 9.648E−02 | −2.990E−02 |

Phase Difference Function Coefficient

| C2 | C4 | C6 | C8 | C10 | C12 | C14 | C16 |
|---|---|---|---|---|---|---|---|
| −1.643E+02 | −5.158E+02 | −7.789E+03 | 4.861E+04 | 1.035E+05 | −1.921E+05 | −4.700E+06 | 1.189E+07 |

Regarding the imaging lens in Example 4, Table 7 shows the values related to the conditional expressions (1) to (11) and Table 8 shows then number of orbicular zones of the diffractive optical surface DOE. As shown in Table 7, the imaging lens in Example 4 satisfies all the conditional expressions (1) to (11). The number of orbicular zones in the effective diameter is 8 and the number of orbicular zones in the area through which rays converging on the optical axis pass is 3, which satisfies the condition to suppress flare.

Figure 8:
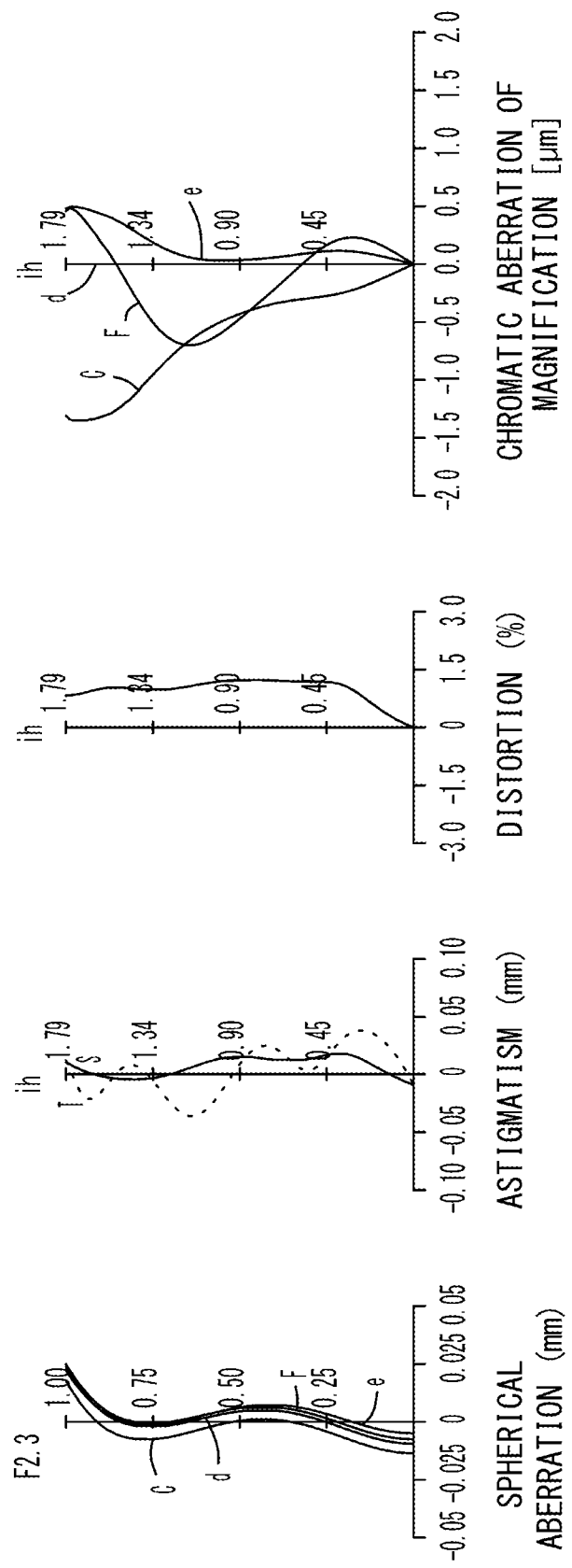
FIG. 8 shows spherical aberration, astigmatism, distortion, and chromatic aberration of magnification of the imaging lens in Example 4.
Figure 9:
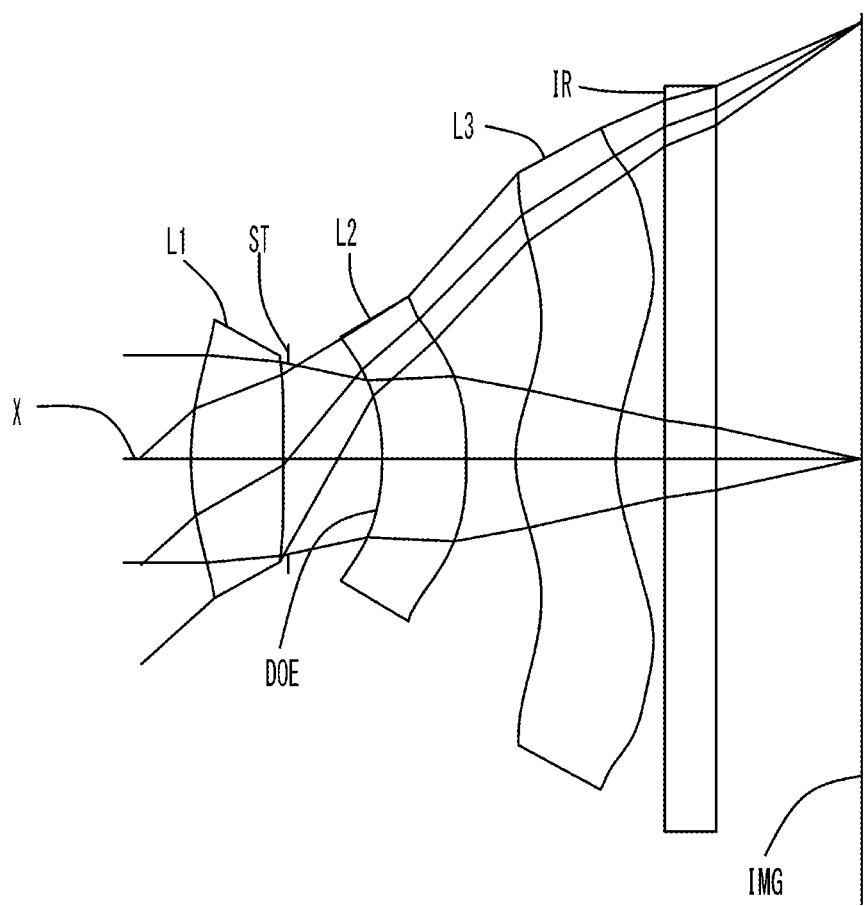
FIG. 9 is a schematic view showing the general configuration of an imaging lens in Example 5 of the present invention.

FIG. 8 shows spherical aberration (mm), astigmatism (mm), distortion (%), and chromatic aberration of magnification (μm) of the imaging lens in Example 4. As shown in FIG. 8, the imaging lens in Example 4 also corrects chromatic aberrations and other aberrations properly. It is sufficiently low-profile with a ratio to diagonal of 0.75 and offers high brightness with an F-value of 2.3 and a wide field of view (2ω) of 83 degrees.

Example 5

The basic lens data of Example 5 is shown in Table 5 below.

TABLE 5 in mm
f = 2.00
Fno = 2.3
ω(°) = 41.6
ih = 1.79
TLA = 2.66
bf = 0.94

Surface Data

| Surface No. i | Curvature Radius r | Surface Distance d | Refractive Index Nd | Abbe Number νd |
|---|---|---|---|---|
| (Object Surface) | Infinity | Infinity | | |
| 1* | 1.306 | 0.386 | 1.544 | 55.57 |
| 2* | Infinity | 0.020 | | |
| 3 (Stop) | Infinity | 0.382 | | |
| 4*DOE | −1.080 | 0.347 | 1.635 | 23.97 |
| 5* | −3.262 | 0.193 | | |
| 6* | 0.515 | 0.397 | 1.544 | 55.57 |
| 7* | 0.655 | 0.200 | | |
| 8 | Infinity | 0.210 | 1.517 | 64.20 |
| 9 | Infinity | 0.606 | | |
| Image Plane | | | | |

Constituent Lens Data

| Lens | Start Surface | Focal Length |
|---|---|---|
| 1 | 1 | 2.40 |
| 2 | 4 | −2.94 |
| 3 | 6 | 2.21 |

| Diffractive Optical Surface | Focal Length |
|---|---|
| 4th Surface | 32.568 |

Aspheric Surface Data

| | 1st Surface | 2nd Surface | 4th Surface | 5th Surface | 6th Surface | 7th Surface |
|---|---|---|---|---|---|---|
| k | −7.395E−01 | 9.900E+01 | 3.304E+00 | 1.398E+01 | −5.392E+00 | −2.515E+00 |
| A4 | 1.934E−02 | −4.257E−01 | −1.877E+00 | −4.765E+00 | −8.662E−01 | −1.089E+00 |
| A6 | −1.909E+00 | 1.946E+00 | 2.690E+01 | 3.680E+01 | 2.005E−01 | 1.838E+00 |
| A8 | 1.095E+01 | −3.150E+01 | −2.982E+02 | −2.221E+02 | 1.906E+00 | −2.309E+00 |
| A10 | −3.736E+01 | 2.058E+02 | 1.900E+03 | 8.880E+02 | −3.472E+00 | 1.991E+00 |
| A12 | 4.186E+01 | −6.865E+02 | −5.960E+03 | −2.183E+03 | 2.907E+00 | −1.094E+00 |
| A14 | 0.000E+00 | 9.721E+02 | 7.792E+03 | 3.024E+03 | −1.219E+00 | 3.364E−01 |
| A16 | 0.000E+00 | 0.000E+00 | 0.000E+00 | −1.779E+03 | 2.052E−01 | −4.327E−02 |

Phase Difference Function Coefficient

| C2 | C4 | C6 | C8 | C10 | C12 | C14 | C16 |
|---|---|---|---|---|---|---|---|
| −1.643E+02 | −5.158E+02 | −7.789E+03 | 4.861E+04 | 1.035E+05 | −1.728E+05 | −4.676E+06 | 1.189E+07 |

Regarding the imaging lens in Example 5, Table 7 shows the values related to the conditional expressions (1) to (11) and Table 8 shows then number of orbicular zones of the diffractive optical surface DOE. As shown in Table 7, the imaging lens in Example 5 satisfies all the conditional expressions (1) to (11). The number of orbicular zones in the effective diameter is 7 and the number of orbicular zones in the area through which rays converging on the optical axis pass is 3, which satisfies the condition to suppress flare.

Figure 10:
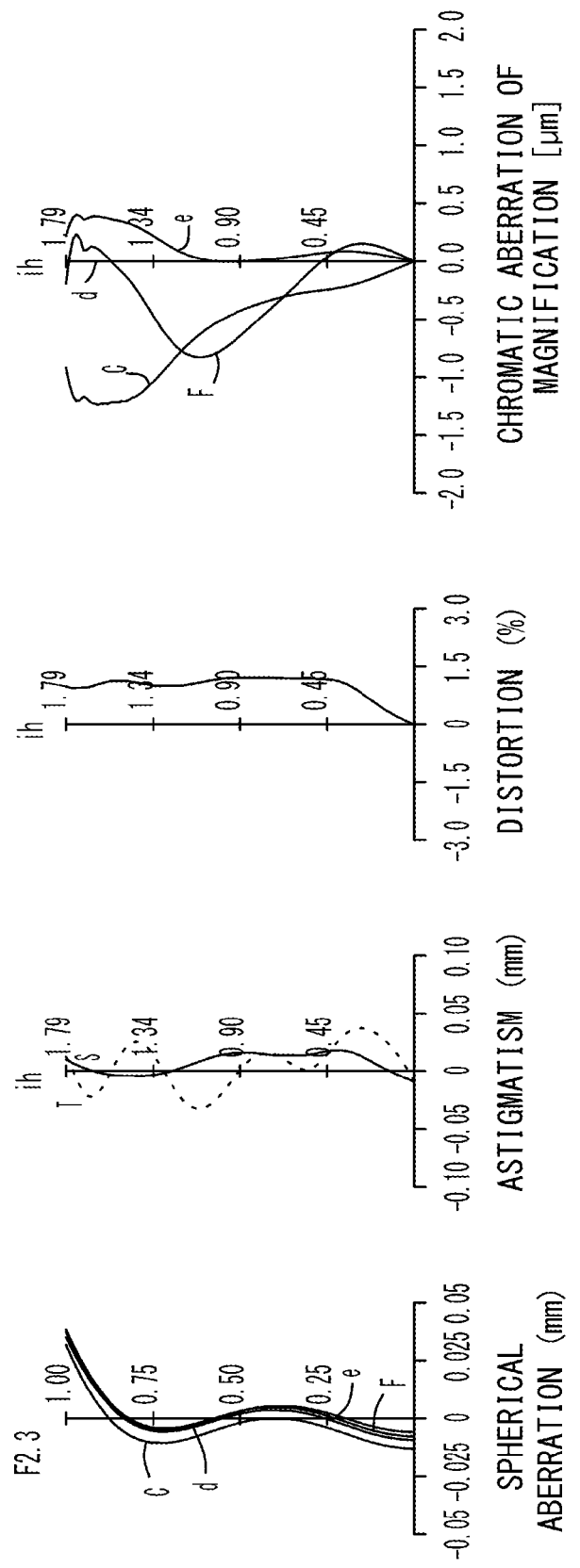
FIG. 10 shows spherical aberration, astigmatism, distortion, and chromatic aberration of magnification of the imaging lens in Example 5.
Figure 11:
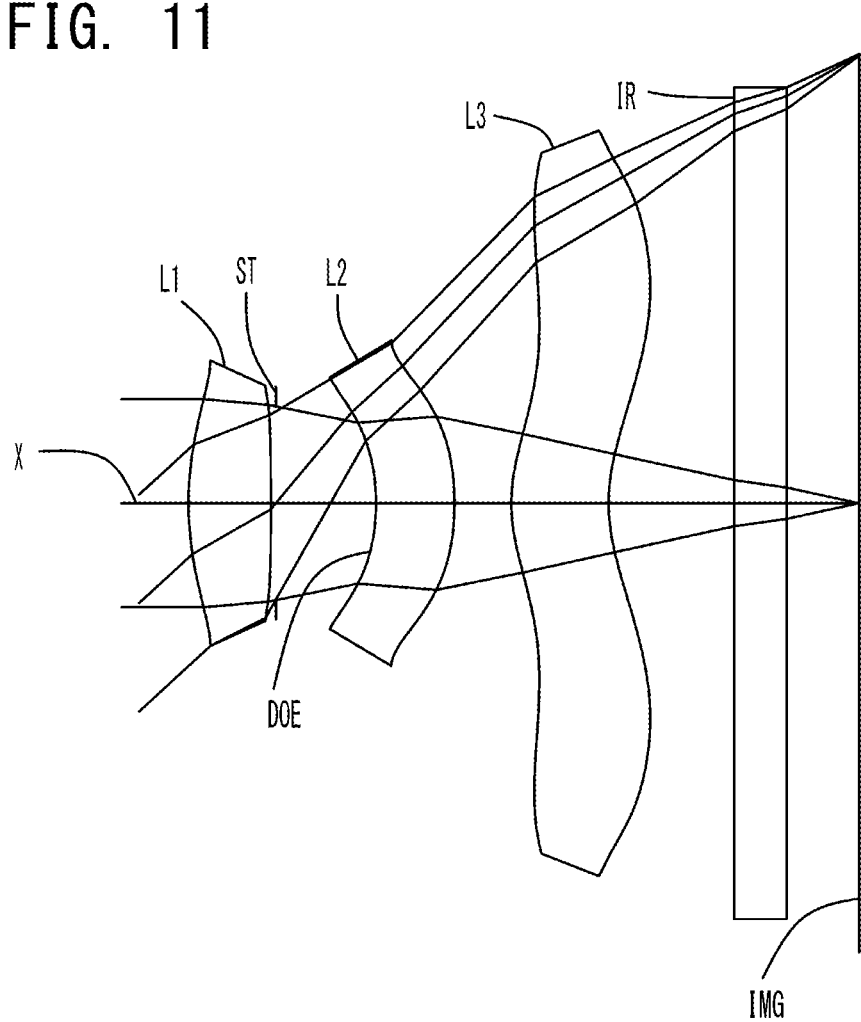
FIG. 11 is a schematic view showing the general configuration of an imaging lens in Example 6 of the present invention.

FIG. 10 shows spherical aberration (mm), astigmatism (mm), distortion (%), and chromatic aberration of magnification (μm) of the imaging lens in Example 5. As shown in FIG. 10, the imaging lens in Example 5 also corrects chromatic aberrations and other aberrations properly. It is sufficiently low-profile with a ratio to diagonal of 0.75 and offers high brightness with an F-value of 2.3 and a wide field of view (2ω) of 83 degrees.

Example 6

The basic lens data of Example 6 is shown in Table 6 below.

TABLE 6 in mm
f = 1.93
Fno = 2.2
ω(°) = 41.6
ih = 1.79
TLA = 2.61
bf = 0.93

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 1.317 | 0.328 | 1.544 | 55.57 |
| 2* | Infinity | 0.020 | | |
| 3 (Stop) | Infinity | 0.400 | | |
| 4*DOE | −0.870 | 0.313 | 1.635 | 23.97 |
| 5* | −1.182 | 0.227 | | |
| 6* | 0.654 | 0.389 | 1.535 | 55.66 |
| 7* | 0.735 | 0.500 | | |
| 8 | Infinity | 0.210 | 1.517 | 64.20 |
| 9 | Infinity | 0.292 | | |
| Image Plane | | | | |

Constituent Lens Data

| Lens | Start Surface | Focal Length |
|---|---|---|
| 1 | 1 | 2.42 |
| 2 | 4 | −10.13 |
| 3 | 6 | 4.15 |

Diffractive Optical Surface | Focal Length

| 4th Surface | 48.072 |
|---|---|

Aspheric Surface Data

| | 1st Surface | 2nd Surface | 4th Surface | 5th Surface | 6th Surface | 7th Surface |
|---|---|---|---|---|---|---|
| k | 1.302E+00 | −9.900E+01 | −2.400E−02 | 5.556E−01 | −5.654E+00 | −2.911E+00 |
| A4 | −2.466E−01 | −4.043E−01 | −1.422E+00 | −2.123E+00 | −7.230E−01 | −7.396E−01 |
| A6 | 5.941E−02 | 5.880E−01 | 1.082E+01 | 9.162E+00 | 7.584E−01 | 1.081E+00 |
| A8 | −5.444E+00 | −1.570E+01 | −1.093E+02 | −2.734E+01 | −2.479E−01 | −1.180E+00 |
| A10 | 1.210E+01 | 1.278E+02 | 5.840E+02 | 3.373E+01 | −1.630E−01 | 8.695E−01 |
| A12 | 3.420E+01 | −5.448E+02 | −1.214E+03 | 3.989E+01 | 1.893E−01 | −4.006E−01 |
| A14 | −2.577E+02 | 9.302E+02 | 7.761E+02 | −3.817E+01 | −6.901E−02 | 1.018E−01 |
| A16 | 3.691E+02 | 0.000E+00 | 0.000E+00 | −7.417E+01 | 9.064E−03 | −1.067E−02 |

Phase Difference Function Coefficient

| C2 | C4 | C6 | C8 | C10 | C12 | C14 | C16 |
|---|---|---|---|---|---|---|---|
| −1.113E+02 | −8.623E+02 | 2.400E+03 | 1.248E+04 | −3.955E+04 | 1.074E+04 | −7.774E+04 | 0.000E+00 |

Regarding the imaging lens in Example 6, Table 7 shows the values related to the conditional expressions (1) to (11) and Table 8 shows then number of orbicular zones of the diffractive optical surface DOE. As shown in Table 7, the imaging lens in Example 6 satisfies all the conditional expressions (1) to (11). The number of orbicular zones in the effective diameter is 5 and the number of orbicular zones in the area through which rays converging on the optical axis pass is 2, which satisfies the condition to suppress flare.

Figure 12:
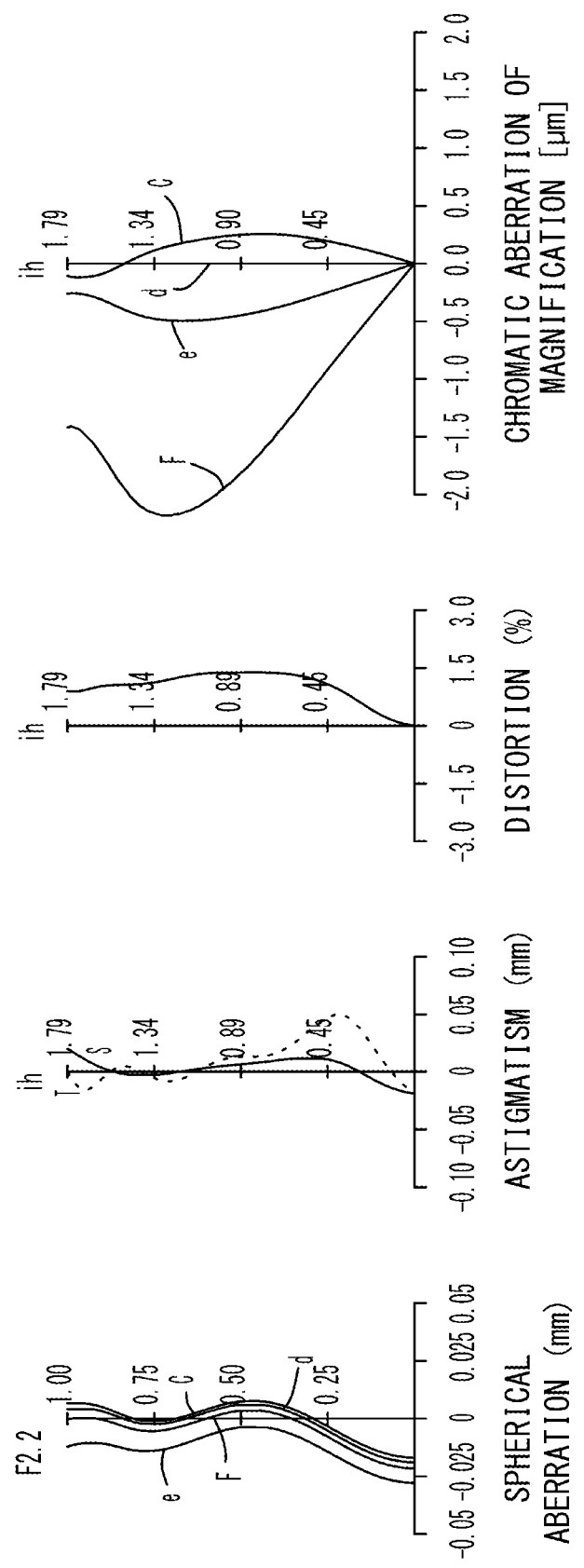
FIG. 12 shows spherical aberration, astigmatism, distortion, and chromatic aberration of magnification of the imaging lens in Example 6.

FIG. 12 shows spherical aberration (mm), astigmatism (mm), distortion (%), and chromatic aberration of magnification (μm) of the imaging lens in Example 6. As shown in FIG. 12, the imaging lens in Example 6 also corrects chromatic aberrations and other aberrations properly. It is sufficiently low-profile with a ratio to diagonal of 0.75 and offers high brightness with an F-value of 2.3 and a wide field of view (2ω) of 83 degrees.

TABLE 7

| | Example 1 | Example 2 | Example 3 | Example 4 | Example 5 | Example 6 |
|---|---|---|---|---|---|---|
| (1) fdoe/f | 9.01 | 9.73 | 14.14 | 16.27 | 16.26 | 24.96 |
| (2) vd1 − vd2 | 31.60 | 31.60 | 31.60 | 31.60 | 31.60 | 31.60 |
| (3) vd3 − vd2 | 31.60 | 31.60 | 31.60 | 31.60 | 31.60 | 31.69 |
| (4) ih/f | 0.91 | 0.90 | 0.90 | 0.90 | 0.89 | 0.93 |
| (5) t3/|r3| | 0.39 | 0.33 | 0.36 | 0.35 | 0.35 | 0.46 |
| (6) (r1 + r2)/(r1 − r2) | −0.85 | −1.00 | −1.00 | −1.00 | −1.00 | −1.00 |
| (7) (r3 + r4)/(r3 − r4) | −2.10 | −3.06 | −1.93 | −1.78 | −1.99 | −6.58 |
| (8) f1/f | 1.24 | 1.18 | 1.23 | 1.20 | 1.20 | 1.26 |
| (9) f2/f | −1.64 | −2.54 | −1.49 | −1.36 | −1.47 | −5.26 |

TABLE 7-continued

|  |  | Example 1 | Example 2 | Example 3 | Example 4 | Example 5 | Example 6 |
|---|---|---|---|---|---|---|---|
| (10) | f3/f | 1.16 | 1.67 | 1.08 | 1.04 | 1.10 | 2.16 |
| (11) | f2/(f1 + f3) | −0.68 | −0.89 | −0.65 | −0.61 | −0.64 | −1.54 |

TABLE 8

|  | Example 1 | Example 2 | Example 3 | Example 4 | Example 5 | Example 6 |
|---|---|---|---|---|---|---|
| Number of Orbicular Zones in Effective Diameter | 8 | 9 | 10 | 8 | 7 | 5 |
| Number of Orbicular Zones in Area through which Rays Converging on Optical Axis Pass | 4 | 4 | 4 | 3 | 3 | 2 |

As explained so far, the imaging lens in the above examples according to the preferred embodiment of the present invention are low-profile and compact enough to be applicable to the low-profile high-density image sensors in the latest mobile terminals, etc. They also offer high brightness and a wide field of view and correct various aberrations properly. These high-performance imaging lenses are each composed of three constituent lenses and can be supplied at low cost.

When any one of the imaging lenses composed of three constituent lenses in the examples according to the preferred embodiment of the present invention is used in an image pickup device mounted in an increasingly compact and low-profile smartphone or mobile phone, PDA (Personal Digital Assistant), or game console or information terminal such as a PC, or a home appliance with a camera function, it delivers high camera performance and contributes to making the image pickup device low-profile.

The effects of the present invention are as follows.

According to the present invention, there is provided a high-performance low-cost imaging lens, composed of three constituent lenses, which is low-profile and compact enough to be applicable to the latest low-profile mobile terminals and capable of correcting various aberrations properly, particularly chromatic aberrations.

What is claimed is:

1. An imaging lens for an image sensor which includes elements arranged in order from an object side to an image side, comprising:
   a first lens having positive refractive power and a convex surface on the object side;
   an aperture stop;
   a second lens that is a meniscus double-sided aspheric lens having negative refractive power and a concave surface on the object side; and
   a third lens that is a meniscus double-sided aspheric lens having positive refractive power near an optical axis and a concave surface on the image side, wherein
   a diffractive optical surface is formed on the object-side surface of the second lens;
   the aspheric object-side and image-side surfaces of the third lens have pole-change points off an optical axis; and
   conditional expressions (1) to (4) below are satisfied:

$$8.0 < fdoe/f < 26.0 \quad (1)$$

$$20 < vd1 - vd2 < 40 \quad (2)$$

$$20 < vd3 - vd2 < 40 \quad (3)$$

$$0.8 < ih/f < 0.95 \quad (4)$$

where
   fdoe: focal length of the diffractive optical surface,
   f: focal length of an overall optical system of the imaging lens,
   vd1: Abbe number of the first lens at d-ray,
   vd2: Abbe number of the second lens at d-ray,
   vd3: Abbe number of the third lens at d-ray, and
   ih: maximum image height.

2. The imaging lens according to claim 1,
   wherein on the diffractive optical surface, the number of orbicular zones in an effective diameter is 10 or less and the number of orbicular zones in an area through which rays converging on the optical axis pass is 5 or less.

3. The imaging lens according to claim 2,
   wherein a conditional expression (5) below is satisfied:

$$0.2 < t3/|r3| < 0.6 \quad (5)$$

where
   t3: distance on the optical axis from the aperture stop to the object-side surface of the second lens, and
   r3: curvature radius of the object-side surface of the second lens.

4. The imaging lens according to claim 2,
   wherein conditional expressions (6) and (7) below are satisfied:

$$-1.2 < (r1 + r2)/(r1 - r2) < -0.6 \quad (6)$$

$$-7.0 < (r3 + r4)/(r3 - r4) < -1.2 \quad (7)$$

where
   r1: curvature radius of the object-side surface of the first lens,
   r2: curvature radius of the image-side surface of the first lens,
   r3: curvature radius of the object-side surface of the second lens, and
   r4: curvature radius of the image-side surface of the second lens.

5. The imaging lens according to claim 2,
   wherein conditional expressions (8) to (10) below are satisfied:

$$1.0 < f1/f < 1.5 \quad (8)$$

$$-6.0 < f2/f < -1.0 \quad (9)$$

$$0.7 < f3/f < 2.4 \quad (10)$$

where
   f1: focal length of the first lens,
   f2: focal length of the second lens including the diffractive optical surface,
   f3: focal length of the third lens, and
   f: focal length of the overall optical system of the imaging lens.

6. The imaging lens according to claim 1,
wherein a conditional expression (5) below is satisfied:

$$0.2 < t3/|r3| < 0.6 \qquad (5)$$

where
- t3: distance on the optical axis from the aperture stop to the object-side surface of the second lens, and
- r3: curvature radius of the object-side surface of the second lens.

7. The imaging lens according to claim 1,
wherein conditional expressions (6) and (7) below are satisfied:

$$-1.2 < (r1+r2)/(r1-r2) < -0.6 \qquad (6)$$

$$-7.0 < (r3+r4)/(r3-r4) < -1.2 \qquad (7)$$

where
- r1: curvature radius of the object-side surface of the first lens,
- r2: curvature radius of the image-side surface of the first lens,
- r3: curvature radius of the object-side surface of the second lens, and
- r4: curvature radius of the image-side surface of the second lens.

8. The imaging lens according to claim 1,
wherein conditional expressions (8) to (10) below are satisfied:

$$1.0 < f1/f < 1.5 \qquad (8)$$

$$-6.0 < f2/f < -1.0 \qquad (9)$$

$$0.7 < f3/f < 2.4 \qquad (10)$$

where
- f1: focal length of the first lens,
- f2: focal length of the second lens including the diffractive optical surface,
- f3: focal length of the third lens, and
- f: focal length of the overall optical system of the imaging lens.

\* \* \* \* \*